United States Patent [19]

Divincenzo et al.

[11] Patent Number: 4,904,319
[45] Date of Patent: Feb. 27, 1990

[54] METHOD OF ULTRASONIC SPLICING TIRE TREAD STRIP EDGES

[75] Inventors: Costantino L. Divincenzo, Parma; Ira L. Wood, Akron, both of Ohio

[73] Assignee: Bridgestone/Firestone, Inc., Akron, Ohio

[21] Appl. No.: 295,741

[22] Filed: Jan. 10, 1989

Related U.S. Application Data

[63] Continuation-in-part of Ser. No. 101,887, Sep. 28, 1987, abandoned.

[51] Int. Cl.⁴ .................. B29C 65/08; B65H 69/08
[52] U.S. Cl. .................. 156/73.4; 156/130.3; 156/134; 156/159; 156/304.5; 156/304.6; 156/580.2
[58] Field of Search ............ 156/73.1, 73.4, 130.3, 156/134, 159, 304.5, 304.6, 421, 580.1, 580.2; 264/23

[56] References Cited

U.S. PATENT DOCUMENTS

| | | | |
|---|---|---|---|
| 2,487,149 | 11/1949 | Leguillon | 156/502 |
| 2,626,430 | 1/1953 | Dawson | 156/73.1 |
| 3,419,447 | 12/1968 | Hewitt | 156/73.3 |
| 3,438,428 | 4/1969 | Balamuth et al. | 156/73.1 |
| 3,483,073 | 12/1969 | Pounder et al. | 156/73.4 |
| 3,577,292 | 3/1971 | Obeda | 156/73.4 |
| 3,725,164 | 4/1973 | Albinger et al. | 156/73.4 |
| 3,874,963 | 4/1975 | Barger | 156/73.2 |
| 3,904,457 | 9/1975 | Laughlin | 156/73.4 |
| 4,090,897 | 5/1978 | Minick | 156/73.1 |
| 4,534,817 | 8/1985 | O'Sullivan | 156/580.2 |
| 4,548,771 | 10/1985 | Senapati et al. | 264/23 |

FOREIGN PATENT DOCUMENTS 910459 3/1982 U.S.S.R. .

Primary Examiner—Michael Wityshyn
Attorney, Agent, or Firm—Ernst H. Ruf

[57] ABSTRACT

A method for splicing beveled edges of a relatively thick tire tread strip free of internal reinforcing cords by ultrasonic energy. A contact face of a sonic welding tool or horn is pressed against the mating overlapping edges of the strip at a cylinder pressure within a range of 20 psi to 80 psi. Ultrasonic energy is applied to the strip while the pressure is applied thereto for a period of between 2 seconds and 12 seconds to heat and soften the rubber compound of the strip without vulcanizing the rubber compound. Pressure is maintained by the tool against the strip after application of the ultrasonic energy for a period of generally between 0.5 to 2.0 seconds to permit the softened compound to cool, set and bond together to form a strong bond between the overlapped edges. The contact face of the horn generally matches the contour of the contacted surface of the strip.

10 Claims, 2 Drawing Sheets

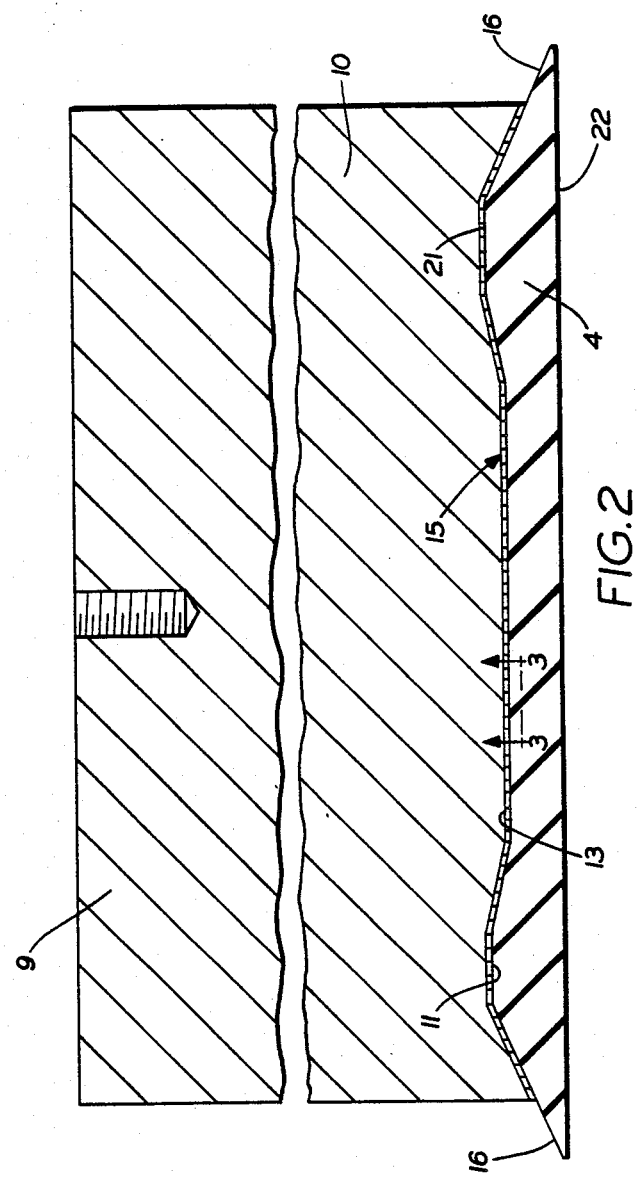
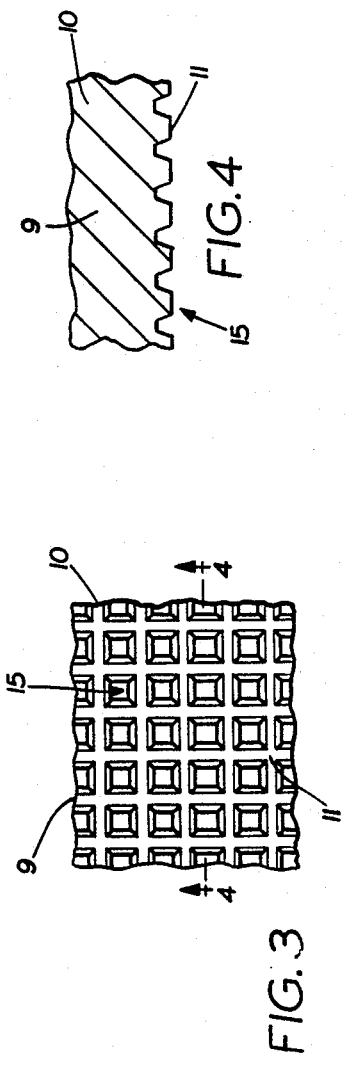
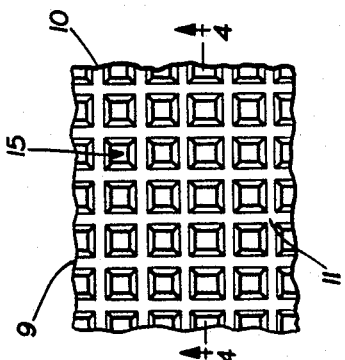
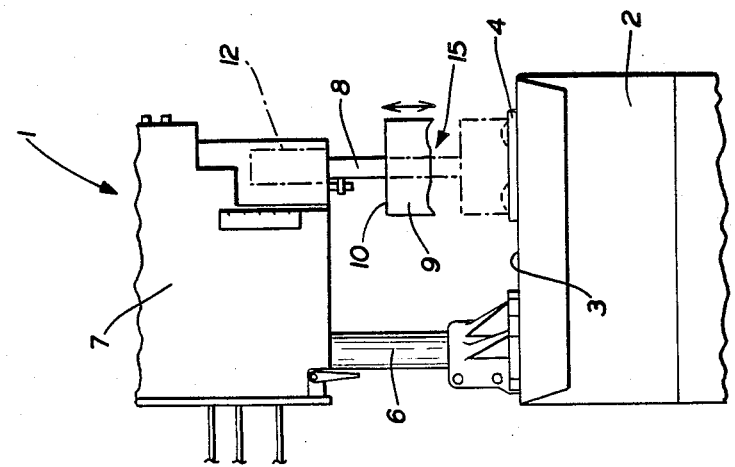

METHOD OF ULTRASONIC SPLICING TIRE TREAD STRIP EDGES

CROSS REFERENCES TO RELATED APPLICATION

This application is a continuation-in-part of pending application Ser. No. 07/101,887, filed Sept. 28 1987, now abandoned.

BACKGROUND OF THE INVENTION

The invention relates to splicing together the edges of a strip of rubber compound material of the type used in the manufacture of tires. More particularly, the invention relates to a method of splicing beveled edges of such a strip used for tire treads with ultrasonic energy to form a strong bond therebetween whereby the strip edges remain bonded during subsequently tire manufacturing procedures.

BACKGROUND INFORMATION

In tire manufacturing, the tire components, usually in strip form, are assembled on one or more cylindrical building drums. Various reinforcing plies are applied to this buildup drum in layers and may contain cords, arranged at predetermined angles, in certain of the strips. The outermost tread forming strip of a nonreinforced rubber compound is placed on the drum over the previously applied strips for forming the final tire carcass prior to the carcass being placed in a mold for curing. The ends of the tread strip must be spliced together to form the green tire and remain bonded until the tire carcass is placed in the curing mold. The tread strip ends are lap spliced by using beveled cut strip ends wherein the beveled ends of the strip are overlapped along the bevel to form a final splice in which the top and bottom surfaces of the strip are continuous without any raised area being formed at the splice location.

Heretofore, these splice joints are formed by preheating the strip and/or cementing, by use of an adhesive, the tread ends together and applying pressure with a stitching or splicing tool. The stitching process is usually performed manually by the tire builder. Such manual splicing results in occasional unsatisfactory tire joints requiring the tire to be subsequently scrapped or requiring resplicing of the Joint should the splice become separated prior to curing. Such manufacturing steps reduce the manufacturing efficiency. The splice must be joined securely to enable the tread strip, which is applied to the drum, to remain in its spliced condition until the tread strip is placed in the curing mold. Depending on production circumstances, the finished uncured tire which includes the tread will be placed in the mold in a relatively short period of time whereas at other times, the built-up carcass or "green tire" will be placed in storage before being formed into a finished tire in the vulcanizing mold.

It is therefore desirable to develop a method to manually and/or automatically bond, splice, and stitch preferably without an adhesive, the two beveled ends of a rubber compound tire tread strip in a reduced time period than heretofore possible whereby the splice remains bonded after the tread strip is placed on the tire carcass and subsequently molded in the curing operation.

The use of sonic or ultrasonic energy has been used in the past for bonding together various materials including chord reinforced rubber. For example, U.S. Pat. No. 4,548,771 discloses a method of vulcanizing rubber by applying ultrasonic energy to the material at a predetermined energy sufficient to generate heat to bond the rubber in which the ultrasonic energy must be applied for at least 10 minutes for each ⅛ inch thickness of the rubber material.

U.S. Pat. No. 3,874,963 discloses a method of bonding thermoplastic sheets together in an overlapping relationship by ultrasonic energy.

U.S. Pat. No. 4,090,897 discloses an ultrasonic welding device for thermoplastic material in which the free end of the fabric are butt seamed together by an ultrasonic welder.

Russian Patent No. 910,459 discloses a method of producing a tire tread by treating the tread strip with ultrasonic energy for a predetermined time period prior to vulcanizing the tread strip.

Another prior art patent of interest relating to ultrasonic bonding of materials is U.S. Pat. No. 3,577,292 which discloses a method for joining two thermoplastic strips by sonic or ultrasonic energy by butt welding the strip ends together.

U.S. Pat. No. 3,904,457 is believed to be the closest prior art to our invention. This patent discloses a method of ultrasonic butt splicing a reinforced tire strip in which the two trimmed ply edges are brought into abutting relationship and sonic energy applied thereto. However, the process of this patent requires the presence of internal reinforcing cord in a relatively thin strip of rubber in order to achieve the satisfactory butt splice. A relatively high cylinder pressure also must be applied to the sonic horn welding tool, generally 90 psi, since too low of pressure will result in ineffective contact between the sonic tool and the strip material. It is specifically stated in this patent that rubber pieces which do not contain reinforcing cords cannot be satisfactory spliced by the ultrasonic splicing technique disclosed therein and that the method is ineffective except for relatively thin strips of cord reinforced material having a thickness of approximately 0.109 inches. Thus, the teaching of U.S. Pat. No. 3,904,457 is contrary to the results desired to be achieved by our method of the present invention described in detail below, that is, the formation of a splice of the beveled ends of a relatively thick strip of tire tread material free of any internal reinforcing cords.

U.S. Pat. No. 2,626,430 discloses another method in which ultrasonic energy is used to vulcanize a piece of uncured rubber in a tire to provide a patch for the tire.

U.S. Pat. No. 3,483,073 discloses the use of ultrasonic energy for the welding together of thin sheets of crosslinked polyurethane.

U.S. Pat. Nos. 2,487,149; 3,419,447; 3,438,428; 3,483,073 and 3,725,164 show other apparatus and methods of ultrasonic welding which are related to the present invention but not as pertinent as those patents discussed above.

SUMMARY OF THE INVENTION

Objectives of the invention include providing a method for splicing together the beveled ends of a tire tread strip, normally on a cylindrical tire building drum, wherein the two ends of the strip are brought together in an overlapping relationship forming a diagonal joint area; in which the strip ends are spliced together by means of an ultrasonic activated splicing horn or tool; and in which the tool applies a predetermined pressure for a predetermined time against the splice joint during welding without vulcanizing the strip material, and a predetermined post holding time at a predetermined pressure is often used to help achieve a bond sufficiently strong to prevent disengagement of the spliced beveled ends until which time the uncured tire, incorporating the spliced tread strip is placed in a vulcanizing mold.

A still further objective of the invention is to provide such an improved method in which the ultrasonic energy is applied to the mating strip ends for a predetermined time period, generally within the range of 2 seconds to 12 seconds; in which the splicing tool or horn is pressed against the top surface of the joint with a cylinder pressure within the range of 20 psi and 80 psi; and in which the post holding time is generally within the range of 0.5 seconds to 2 seconds but could be greater with the contact face of the welding tool also preferably being pressed against the strip at a pressure generally the same as that of the pressure applied to the horn during the application of the ultrasonic energy. The application of ultrasonic energy, the post holding time and cylinder pressures used for both may vary depending on material, material thickness, and horn design.

A still further objective is to provide such an improved method which is used for splicing the beveled ends of relatively thick tire tread strip material, generally having a thickness of between ⅛ inch and ⅝ inches, but potentially as thick as 2 inches; in which the rubber compound of the strip need not be bonded throughout the entire diagonal length of the splice joint but only a sufficient distance inwardly from the outer surface, which is contacted by the welding tool or a sonic horn, to provide a sufficiently strong joint without vulcanizing the rubber compound; and in which the beveled mating ends of the strip when brought together need not be heated and are free of any adhesive or other bonding material.

A still further objective is to provide such an improved method in which the contact face of the welding tool generally conforms to the contour of the strip contacted thereby except that the edges of the strip are preferably free of contact by the tool to reduce the possibility of the tool contacting the metal surface of the drum adjacent the strip edges; and in which the contact face of the tool preferably is knurled. This does not preclude the use of other sonic horn shapes or application methods that can successfully transfer the ultrasonic energy to the splice area.

Another objective is to provide such an improved method which eliminates the heretofore manual stitching and adhesive bonding of the strip ends; in which the width of the contact face of the welding tool is equal to or greater than the width of the diagonal splice; in which the improved method provides a satisfactory splice by the application of uniform pressure and ultrasonic energy throughout the splice area; in which the method can be carried out on existing tire building machinery and need not be performed on a flat surface or on spliced equipment thereby permitting usual tire making operations to be utilized for implementation of the improved splicing procedure; and in which the improved method produces a satisfactory splice for the beveled ends of a relatively thick strip tire tread material in a reduced cycle time than heretofore required for producing such splices by usual manual procedures.

These objectives and advantages of the invention are obtained by the improved method, the general nature of which may be stated as a method for splicing together a pair of beveled mating edges of a rubber compound tire tread strip which is preferably free of any internal cords and has a thickness of at least ⅛ inch, including the steps of bringing the beveled edges of a strip of unvulcanized rubber compound into an overlapping contiguous relationship to form a splice joint extending angularly between outer opposed surfaces of the strip; pressing a contact face of an ultrasonic welding tool or horn against one surface of the strip at the splice joint at a first pressure within the range of 20 psi to 80 psi; applying ultrasonic energy against said one surface for a first time period within the range of 2 to 12 seconds within the first pressure range to heat and soften the rubber compound without vulcanizing along at a portion of the splice joint adjacent said one surface sufficiently for the compound to bond together across a portion of the splice joint; and maintaining a second pressure against said one strip surface by the face of the ultrasonic welding tool for a second time period within the range of 0.5 to 2.0 seconds after stopping the application of the ultrasonic energy permitting the softened rubber compound to cool sufficiently to form a stronger bond between the beveled edges of the splice joint adjacent the said one strip surface.

BRIEF DESCRIPTION OF THE DRAWINGS

A preferred embodiment of the invention, illustrative of the best mode in which applicants contemplate applying the principles of this invention, is set forth in the following description and is shown in the drawings, and is distinctly pointed out and set forth in the appended claims.

FIG. 1 is a fragmentary diagrammatic side elevational view of a type of ultrasonic welding equipment which may be used for the ultrasonic welding of a tire tread strip splice by the improved method of the invention;

FIG. 2 is a greatly enlarged transverse sectional view showing the welding horn or tool of the equipment of FIG. 1 in engagement with the tire tread strip;

FIG. 3 is an enlarged fragmentary sectional view looking in the direction of arrows 3—3, FIG. 2 showing the output or contact surface of the welding horn;

FIG. 4 is an enlarged fragmentary sectional view taken on line 4—4, FIG. 3;

Similar numerals refer to similar parts throughout the drawings.

DESCRIPTION OF THE PREFERRED EMBODIMENT

Figure 5:
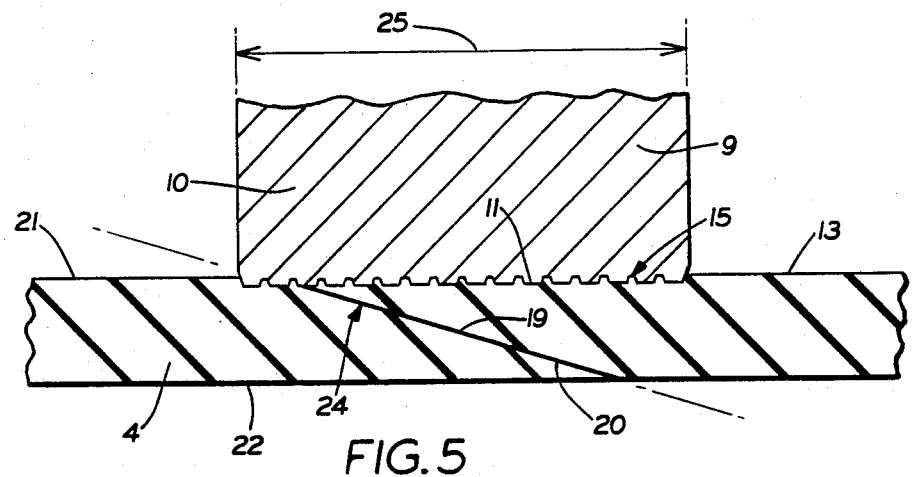
FIG. 5 is an enlarged longitudinal sectional view showing the welding horn ultrasonically welding a tread strip splice in accordance with the improved method.

One type of welding equipment which may be used to assist in carrying out the steps of the improved method is indicated generally at 1, and is shown in FIG. 1. Welding equipment 1 consists of a base 2 having an upper surface 3 for supporting a strip of tire tread material 4 thereon. The tread strip may be supplied to base 2 by a conveyor or other automatic equipment or can be manually placed thereon by a workman. Also, base 2, as well as surface 3, may be cylindrical or drum-shaped and can be the actual tire making drum or drums on which the tread strip is assembled having the other layers of the tire components previously assembled thereon, with tread strip 4 being the final strip to be placed on the previously assembled strip in forming a green tire.

Equipment 1 includes a fixed support column 6 and an upper housing 7 in which the various controls and power supplies can be contained depending on the vendor and model. A movable sonic converter or converter and booster assembly 8 having a welding horn or tool 9 mounted to the lower end of the converter or converter and booster extends downwardly therefrom. As shown in FIG. 1, horn 9 is raised and lowered into and out of contact with strip 4 by a usual fluid pressure cylinder shown diagrammatically at 12 which is located in housing 7. One type of welding equipment 1 found suitable for practicing the method of the invention is identified as an ultrasonic press manufactured by Dukane Corporation of Illinois, identified as its model 43B15 press with 1800 watt generator. A higher or lower wattage generator can be used depending on the requirements. The term ultrasonic refers to sound frequencies generally above a range of 16 to 20 Khz and shall be defined as such herein. The term ultrasonic as used herein is also used interchangably with the term sonic which will also have the same definition.

Welding horn 9 is shown particularly in FIGS. 2–4 and consists of a main body 10 having a strip engaging face 11. The particular contour of face 11 preferably matches the contour of top surface 13 of strip 4, as shown in FIG. 2. Horn face 11 preferably is formed with a knurled contact surface indicated generally at 15, which is shown particularly in FIGS. 3 and 4. It has been found that knurled or patterned surface 15 provides a more satisfactory transfer of ultrasonic energy to the splice than a smooth contact surface although the invention need not be limited to such a knurled surface configuration.

Strip 4 may have various rubber compound compositions and preferably is of the type used for forming the final layer of a builtup tire carcass while still in the "green" or uncured state and usually provides the material for forming the final tread of the finished tire. In addition to contact face 11 of welding horn 9 generally conforming to the cross sectional profile of tire tread strip 4, it preferably does not extend the complete width of the tread strip as shown in FIG. 2, but stops at a spaced relationship and provides a pair of uncontacted areas 16 extending along the longitudinal edges of strip 4. Areas 16 insure that welding horn 9 does not contact base surface 3 or the tire building drum or other metal surface supporting the strip to prevent metal to metal contact and the resulting problems therewith.

Figure 6:
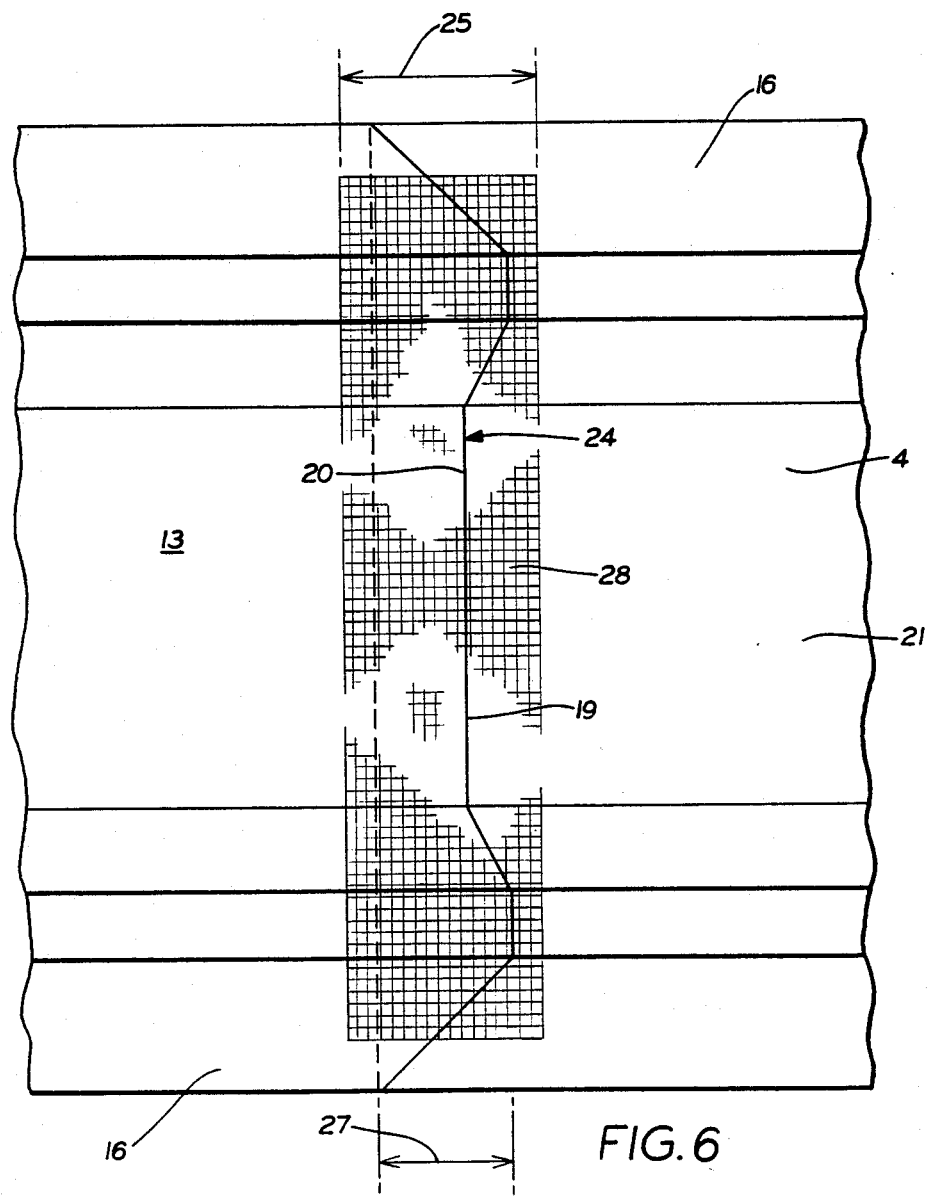
FIG. 6 is a fragmentary top plan view of a portion of the tire tread strip after the ultrasonic weld has been made thereon.

Referring to FIG. 5, strip 4 is formed with a pair of beveled edges 19 and 20 which are tapered forming an included angle within the range of between 20° and 85° with respect to outer surfaces 21 and 22, respectively, of strip 4. Beveled edges 19 and 20 are brought together and placed in overlapping contiguous relationship, as shown in FIG. 5, either manually or automatically on a tire building drum or surface 3 as shown in FIG. 1 to form a splice joint indicated generally at 24. Splice joint 24 extends diagonally across the width of the strip as shown particularly in FIGS. 5 and 6. After joining the beveled edges into abutting relationship, welding horn 9 is brought into pressure engagement with the strip, and in particular with outer or top surface 21 thereof. Preferably the width or thickness of welding horn 9, indicated at 25 in FIGS. 5 and 6 is equal to or greater than the width of splice joint 24 indicated at 27 when measured in the longitudinal strip direction, and is aligned whereby the contact face 11 completely covers the splice joint.

Ultrasonic energy is applied to tread strip 4 through welding horn 9 for a predetermined time period and with a predetermined cylinder pressure on the welding horn. The ultrasonic energy causes the rubber compound to heat, soften, and bond together across at least the top surface of splice joint 24 to secure beveled ends 19 and 20 together in a firm bond without vulcanizing the rubber compound. The bond must be sufficient to withstand further handling of the joined strip 4 if necessary, or to remain joined until the green tire incorporating strip 4 is placed in a curing mold.

In further accordance with the invention, horn 9 preferably is maintained in pressure engagement with strip 4 for a predetermined time period after stopping the application of ultrasonic energy to the strip. This post holding of the splice for a predetermined time enables the previously softened material at the splice joint to cool, set, and bond to form a tight bond before removal of the welding horn. The knurled surface 15 of welding horn 9 will impart a knurled pattern, indicated at 28, FIG. 6, on the outer surface 21 of strip 4 as shown in FIG. 6.

The bonding of beveled edges 19 and 20 need not extend completely throughout the diagonal length of splice joint 24, but can extend only a portion inwardly from surface 21 diagonally along joint 24 and still form a satisfactory splice. The joined or spliced strip normally will be rolled into a curved configuration when joined and thus the area of the splice adjacent at inner surface 22 will be compressed together and will not tend to separate from each other as could the other portion of the joined splice adjacent at outer surface 21, which is in tension.

In accordance with the invention, strip 4 is a relatively thick strip of material, that is, a strip generally within the range of ¼" to ¾", but potentially 2¼" thick, which will enable the method of the invention to be used in the manufacture of most pneumatic tire sizes. Also, strip 4 is preferably free of any internal reinforcements, and in particular free of reinforcing cords of metal, fabric, nylon, or the like which is in direct contrast to the particular method and tire tread joint thereby as shown in U.S. Pat. No. 3,904,457.

In summary, use of ultrasonic energy applied against the splice joint at cylinder pressures ranging from 20 psi to 80 psi during formation of beveled splice joint 24 achieves the most satisfactory results. The process of ultrasonic tread splicing as described herein is greatly dependent on a number of factors which include the contact between the tread and horn transmitting the ultrasonic energy, the horn amplitude, the amount of power available to the horn, the contact area of the horn, the time of contact, the material being spliced, and the pressure applied to the horn. For this reason the lower splicing pressures outlined herein will require special attention to insure that good relationships between these factors are obtained to be effective in ultrasonic splicing and could require the use of smaller and/or several horns in the splicing apparatus. The nominal sonic frequency is 20 Khz, although the generator operating and horn tuning frequencies may vary slightly about this nominal range without materially affecting the splice joint achieved thereby. The sonic amplitude at the output of the 20 Khz sonic converter is approximately 0.0008 inches @ 1000/1800 watts. Again, the amplitude of the horn will vary depending on the booster size and gain factor of the horn.

The use of a knurled surface on welding horn face 11 appears from the test performed to provide the most successful surface finish for introducing the sonic energy into the strip material. However, this would not preclude the use of another surface finish or design that works effectively and practically for other strip splicing applications. Other tests have indicated that the generator power and the amplitude introduced by the welding horn affect the welding time. Also the composition of the material being spliced contributes to determining the length of time that the sonic energy is applied to the splice to achieve a satisfactory joint.

Depending upon the sonic splicing time used during the splicing operation generally within the range of 2 to 5 seconds although a longer period of time up to 12 seconds may be used, it affects the temperature at the top surface or surface 21 which was in contact with welding horn face 11. Tests have shown that this temperature may range from 122° F. @ 2 seconds to 280° F. @ 10 seconds, with the temperature on the uncontacted surface, or bottom surface 22 of the strip, ranging from 93° F. @ 2 seconds to 160° F. @ 10 seconds. The temperatures depend on the sonic weld and hold time and pressure applied. Also, during recent testing, hold times of from 0.5 seconds to 2.0 seconds were tried successfully. Ultimately the lower the post curing hold time the better, in order to speed up splicing operations. However, it is believed that post hold times of from 0.5 seconds to 2.0 seconds are beneficial after removal of the sonic energy to allow the molecular action in the strip material to slow down under pressure rather than removing the welding horn the instant that the application of the sonic energy has ended. The amount of post hold time could be greater if found to be necessary. Also, the additional post holding time, together with the application of the post holding pressure, also is believed to produce a beneficial mechanical splicing action.

Furthermore, the length of time that the ultrasonic energy is applied to the top surface of the splice and the amount of pressure helps determine the depth of weld penetration and heat introduced along the diagonal splice 24 from top surface 21 towards the bottom or other outer surface 22. The overall thickness of the strip does not play a major role since the splice joint needs to be formed only a portion of the diagonal length of joint 24 to effectively seal the upper or top surface of the beveled splice area. However, the greater length that is Joined along diagonal splice Joint 24, the stronger will be the final bond between beveled edges 19 and 20. It is potentially possible that the entire splice Joint from surface 21 to surface 22 may be joined for certain applications on thin materials, although normally such complete bonding at the splice joint need not be achieved for the intended purpose of the invention, that is, the formation of a splice joint in the tire tread strip sufficiently strong to enable the tire incorporating the strip to be subsequently handled and/or stored until placement in a curing mold. However it is most important that the strip material remains unvulcanized since if the resulting joint be vulcanized it would result in problems when the "green" tire carcass is placed in a mold for final vulcanization.

Tests have shown that it is preferable that nearly the entire length and width of the splice area should be covered by the welding horn but without allowing the horn to contact any metal surfaces adjacent the edges of the rubber strip, and thus the reason for forming uncontacted areas 16 as shown in FIGS. 2 and 6. Also the post holding pressure preferably is equal to the pressure applied by the welding horn during the application of the ultrasonic energy principally to avoid changing of the pressure from one amount to another. However, the post holding pressure can vary from the application pressure without affecting the concept of the invention. Again, the amount of post holding pressure can vary in the same range as the ultrasonic energy application pressure, that is, a cylinder pressure of between 20 psi and 80 psi and during a post holding time period of from 0.5 seconds up to 2 seconds, or greater if needed. This pressure range is the cylinder pressure which is applied to the horn and not the actual pressure applied to the strip by the horn face.

The improved method provides for the splicing of a relatively thick tire tread strip of material which is preferably free of any internal reinforcing cords to form a strong bond throughout part of the mating overlapping diagonally extending splice joint without vulcanization so that the beveled strip ends remain bonded until the green tire incorporating this tread strip has been placed in a curing mold for final vulcanization.

Accordingly, the improved method is simplified, provides an effective, safe, inexpensive, and efficient method which achieves all the enumerated objectives, provides for eliminating difficulties encountered with prior methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which steps of the improved method of ultrasonic splicing tire tread strip edges are carried out, the characteristics of the method, and the advantageous, new and useful results obtained are set forth in the appended claims.

We claim:

1. A method of splicing together a pair of beveled mating edges of an unvulcanized rubber compound tire tread strip which is free of any internal reinforcing cords and has a thickness of at least ⅛ inch, including the steps of:
    (a) bringing the beveled edges of said tire tread strip of unvulcanized rubber compound into a partial overlapping contiguous relationship to form a splice joint extending angularly between outer opposed surfaces of t he strip;
    (b) pressing a contact face of an ultrasonic welding horn against one surface of the strip at the splice joint at a first pressure within the range of 20 psi to 80 psi;
    (c) applying ultrasonic energy against said one surface for a first time period within the range of 2 to 12 seconds at the first pressure range to heat and soften the rubber compound without vulcanizing along a first portion of the splice joint adjacent said one surface sufficiently for the compound to bond together across said first portion of the splice joint without bonding a second portion of the splice joint located adjacent the other surface of the opposed strip surfaces; and (d) maintaining a second pressure against said one strip surface by the face of the ultrasonic generator for a second time period within the range of 0.5 to 2 seconds after stopping the application of the ultrasonic energy permitting the softened rubber compound to cool sufficiently to form a stronger bond between the beveled edges of the splice joint along said first portion adjacent the said one strip surface.

2. The method defined in claim 1 including the step of matching the contact face of the ultrasonic welding horn generally to the profile of said one surface of the strip contacted thereby.

3. The method defined in claim 1 including the step of providing the contact face of the ultrasonic energy generator with a knurled surface.

4. The method defined in claim 1 including the step of providing the contact face of the ultrasonic welding horn when pressing against said one surface of the strip, with a width measured in a longitudinal strip direction at least equal to the width of the splice joint measured in said longitudinal strip direction.

5. The method define in claim 1 including the step of providing the angle of bevel of the mating edges of the tire tread strip to be within the range of 20° to 85° with respect to the said one surface of the strip.

6. The method defined in claim 1 in which the second pressure is generally within the range of said first pressure.

7. The method defined in claim 1 in which the ultrasonic energy has a nominal frequency of 20 khz.

8. The method defined in claim 1 in which the said one surface of the tire tread strip reaches a temperature within the range of 122° F @ 2 seconds and 280° F. 10 seconds upon applying the ultrasonic energy for the first time period.

9. The method defined in claim 1 in which the beveled edges are free of an adhesive prior to being placed into overlapping relationship.

10. The method defined in claim 1 in which the contact face of the ultrasonic welding horn when pressing against said one surface of the strip has a length measured in a direction transverse to a longitudinal strip direction which is less than the transverse width of the tire tread strip providing two spaced edge portions of the splice joint free from contact by said contact face.

* * * * *

UNITED STATES PATENT AND TRADEMARK OFFICE
CERTIFICATE OF CORRECTION

PATENT NO. : 4,904,319

DATED : February 27, 1990

INVENTOR(S) : Costantino L. Divincenzo and Ira L. Wood

It is certified that error appears in the above-identified patent and that said Letters Patent is hereby corrected as shown below:

Column 6, line 40

"1/841 to 5/841, but potentially 241" should read

--1/8" to 5/8", but potentially 2"--

Column 8, line 59

"t he" should read -- the --

Column 9, line 7

"generator" should read -- welding horn --

Column 9, line 22

"energy generator" should read -- welding horn --

Signed and Sealed this

Thirtieth Day of April, 1991

*Attest:*

HARRY F. MANBECK, JR.

*Attesting Officer*     *Commissioner of Patents and Trademarks*